July 13, 1926.  
W. COX ET AL  
1,592,180  
APPARATUS FOR MAKING WIRE GLASS  
Filed Dec. 18, 1920 3 Sheets-Sheet 1
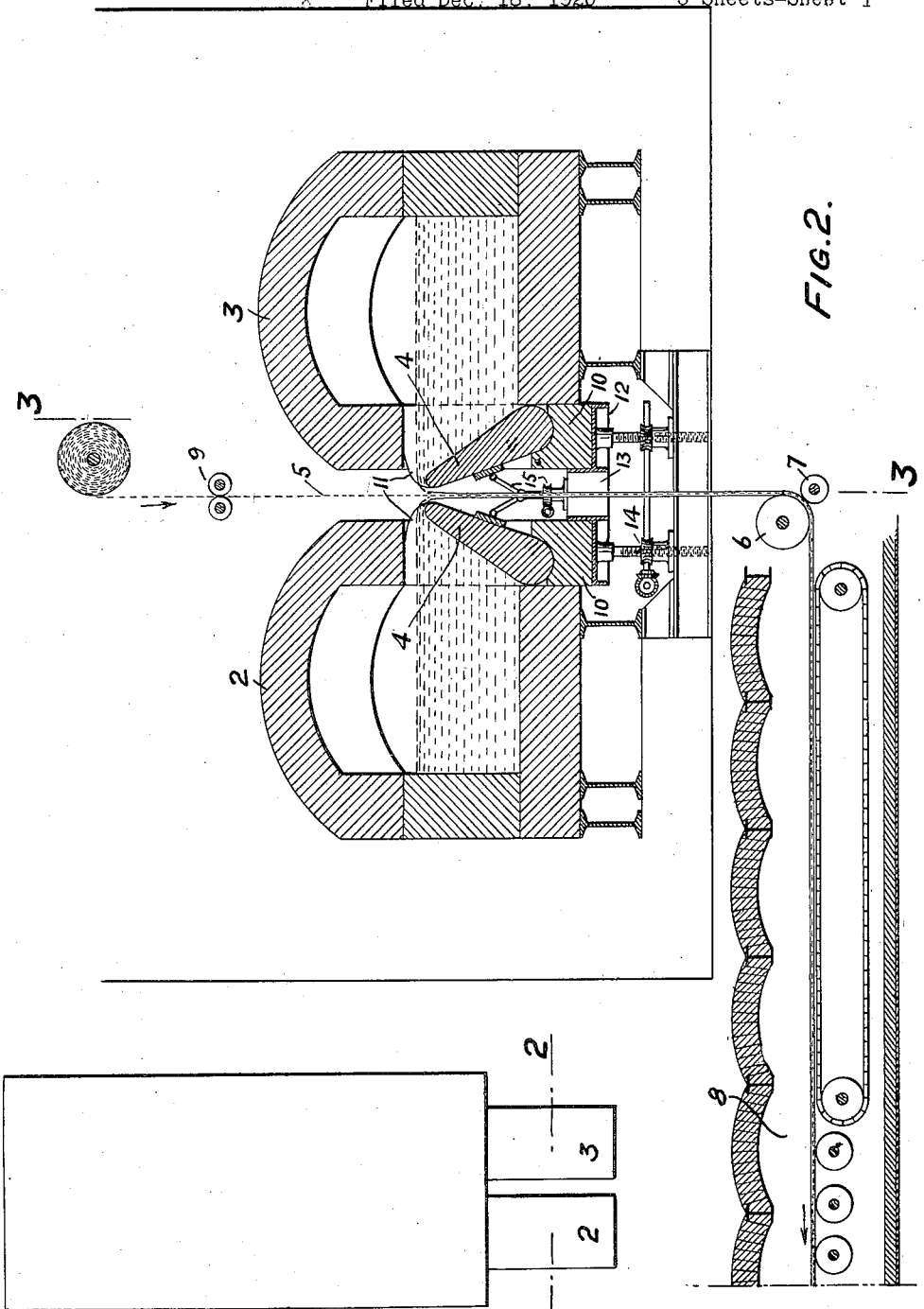
INVENTOR  
Walter Cox and  
Arno Shuman  
Augustus B Stoughton  
ATTORNEY.
WITNESS:  
Robt W Kitchel.

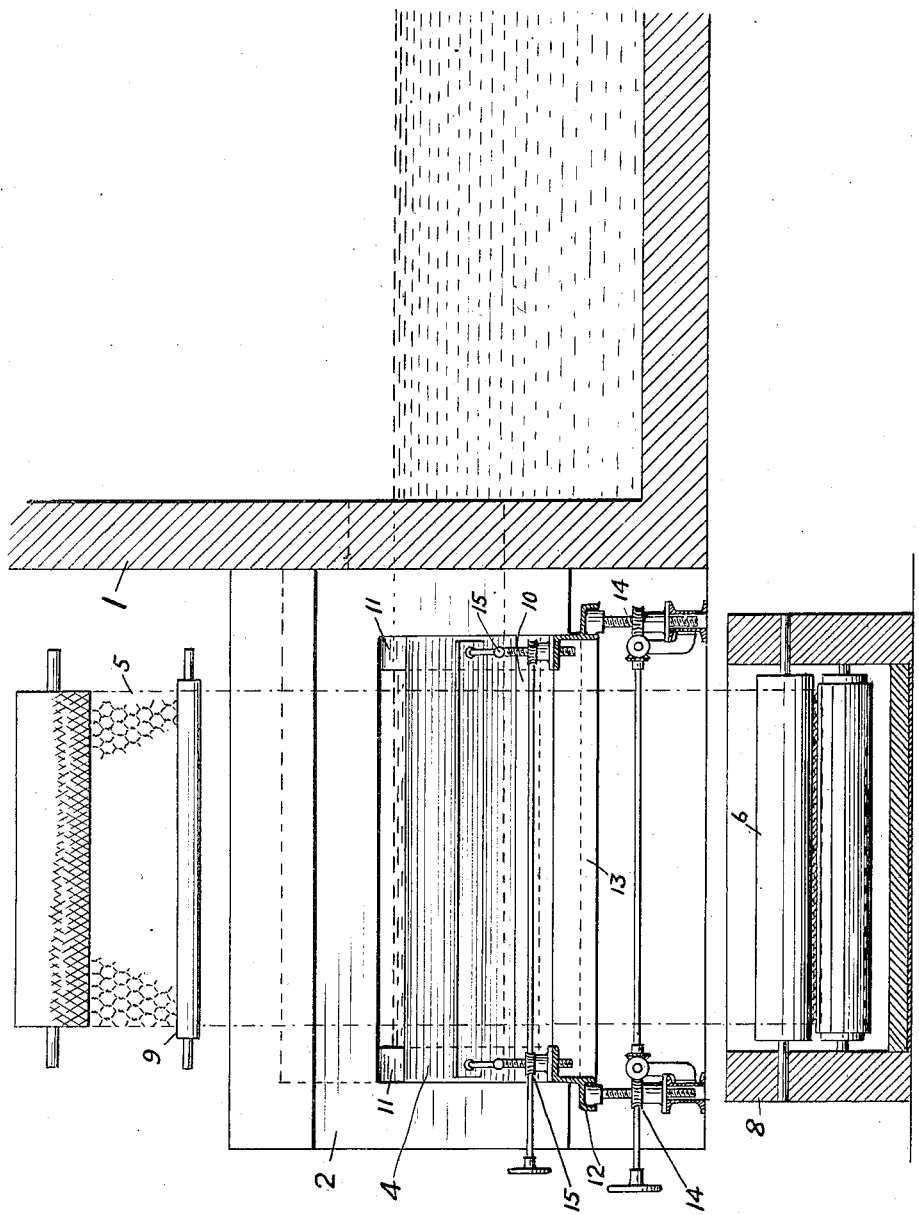

July 13, 1926.

W. COX ET AL 1,592,180

APPARATUS FOR MAKING WIRE GLASS

Filed Dec. 18, 1920  3 Sheets-Sheet 3

WITNESS:

INVENTOR
Walter Cox and
Arno Shuman

ATTORNEY

Patented July 13, 1926.

1,592,180

UNITED STATES PATENT OFFICE.

WALTER COX AND ARNO SHUMAN, OF PHILADELPHIA, PENNSYLVANIA, ASSIGNORS TO PENNSYLVANIA WIRE GLASS COMPANY, OF PHILADELPHIA, PENNSYLVANIA, A CORPORATION OF NEW JERSEY.

APPARATUS FOR MAKING WIRE GLASS.

Application filed December 18, 1920. Serial No. 431,586.

The principal object of the present invention is to provide for the practical, economical and continuous production of wire glass from glass taken directly from a glass tank furnace or from parts thereof.

To this and other ends hereinafter set forth, the invention comprises the improvements to be presently described and finally claimed.

In the accompanying drawings, forming part hereof—

Figure 1 is a diagrammatic plan of a glass tank furnace having extensions.

Fig. 2, is a sectional view taken on the line 2—2, of Figure 1, but additionally showing the parts and mechanisms.

Fig. 3, is a section on the line 3—3, of Fig. 2, looking towards the left, and

Figure 4:
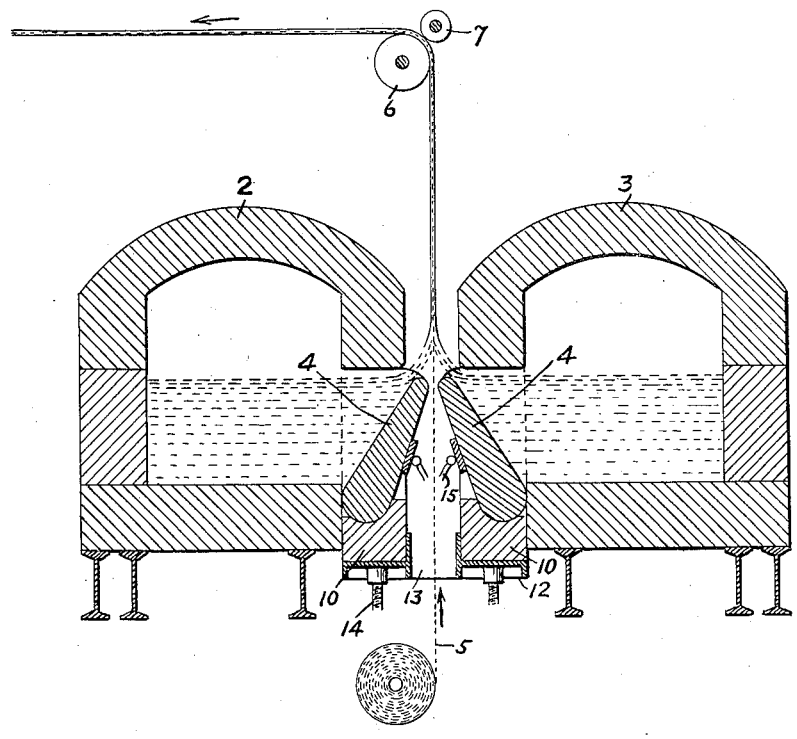
Fig. 4 is a view similar to Fig. 2, but showing a modification.

In the drawing 1 indicates a glass tank furnace or like apparatus, and it is provided with extensions 2 and 3 in which the glass level is constant, because the glass level in the tank is kept constant, as by appropriate charging. These extensions 2 and 3 are provided with confronting dams 4 over which confluent streams of glass flow by gravity, and wire netting or mesh 5 is continually passed through the confluence of the streams, either downwards as in Figs. 2 and 3, or upwards as in Fig. 4. The rate of flow and the speed of travel of the wire netting or mesh are properly co-ordinated for the production of a continuous sheet of wire glass presenting improved surfaces and cheaply and rapidly produced. This sheet of wire glass may be passed by rolls 6 and 7 into a lehr 8, and one of these rolls 7, may be a figuring roll. 9 are rolls for feeding the wire netting or mesh from a roll. Each dam 4 is shown as turnably seated on a block 10 and as provided with end walls 11. The blocks 10 are adjustable vertically, for example, by mounting them upon a frame 12, open as at 13 for the passage of wire or wire glass and mounted upon jack-screw-gear 14. The dams can be turned on the blocks 10, to adjust them by means of the link and screw mechanism 15. The described adjustments of the dams are not provided for use as essential operating adjustments, because when the dams are once set right for the speed of the wire netting feed employed, the operation requires no adjustment since the glass level may be maintained constant by appropriate charging.

Obviously modification may be made in details of construction and arrangement without departing from the spirit of the invention which is not limited as to such matters or otherwise than as the prior art and the appended claims may require.

We claim:

1. Apparatus for making wire glass comprising the combination of a glass tank furnace having confronting dams arranged below the normal glass level in the tank and over which the glass is required to flow, and means for continuously passing wire netting between the dams, substantially as described.

2. Apparatus for making wire glass comprising the combination of a glass tank furnace, confronting extensions communicating with the interior of the tank, opposed dams in the confronting portions of the extensions and over which the glass is required to flow, and means for continuously passing wire netting between the dams, substantially as described.

3. Apparatus for making wire glass comprising the combination of a glass tank furnace, confronting dams over which confluent streams of glass flow from the tank, means for pivotally adjusting the dams to regulate the confluence of the flow, and devices for passing wire netting between the dams and through the confluence of the streams, substantially as described.

4. Apparatus for making wire glass comprising the combination of a glass tank furnace, confronting dams over which confluent streams of glass flow from the tank, means for feeding wire netting between the dams and through the confluence of the streams, and devices for turnably and vertically adjusting the dams, substantially as described.

5. Apparatus for making wire glass comprising the combination of a glass tank furnace having confronting overflow dams, a lehr below the furnace and to one side of the dams, and means for continuously feeding wire netting downwards between the dams and into the lehr, substantially as described.

6. In apparatus for making wire glass the combination of a glass tank wall, a dam turnably mounted in its wall and provided with end walls, and means for turnably adjusting the dam and its end walls, substantially as described.

WALTER COX.
ARNO SHUMAN.